United States Patent
Hunold et al.

(10) Patent No.: US 11,511,616 B2
(45) Date of Patent: Nov. 29, 2022

(54) TRANSMISSION ARRANGEMENT FOR A VEHICLE HYBRID DRIVE

(71) Applicant: ZF Friedrichshafen AG, Friedrichshafen (DE)

(72) Inventors: Bernard Hunold, Friedrichshafen (DE); Michael Preuß, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/185,006

(22) Filed: Feb. 25, 2021

(65) Prior Publication Data
US 2021/0268891 A1     Sep. 2, 2021

(30) Foreign Application Priority Data

Mar. 2, 2020   (DE) ............... 10 2020 202 659.9

(51) Int. Cl.
 *B60K 6/547*   (2007.10)
 *B60K 6/365*   (2007.10)

(52) U.S. Cl.
 CPC .............. *B60K 6/547* (2013.01); *B60K 6/365* (2013.01)

(58) Field of Classification Search
 CPC .......... B60K 6/547; B60K 6/365; B60K 6/36; B60K 2006/4808; B60K 2006/4841; B60K 6/48; B60K 6/20; B60K 2006/381; F16H 37/046; F16H 2200/0078; F16H 2200/0069; F16H 2200/201; F16H 2200/2035; F16H 47/02; B60T 1/087
 See application file for complete search history.

(56) References Cited

U.S. PATENT DOCUMENTS

| | | | |
|---|---|---|---|
| 9,545,840 B2 * | 1/2017 | Zhu | B60K 6/48 |
| 2007/0113695 A1 * | 5/2007 | Adams | F16H 47/06 |
| | | | 74/339 |
| 2020/0124153 A1 * | 4/2020 | Graf | F16H 3/66 |

FOREIGN PATENT DOCUMENTS

| | | | |
|---|---|---|---|
| DE | 10 2009 001 146 A1 | 8/2010 | |
| DE | 10 2009 001 147 A1 | 8/2010 | |
| DE | 10 2011 017 762 A1 | 10/2012 | |
| DE | 10 2011 106 444 A1 | 1/2013 | |
| DE | 10 2012 220 634 A1 | 5/2014 | |
| DE | 102015211485 A1 * | 12/2016 | B60T 1/087 |

(Continued)

OTHER PUBLICATIONS

Machine translation of DE 102009001147 A1 (Year: 2010).*

(Continued)

*Primary Examiner* — Timothy Hannon
*Assistant Examiner* — Farhana Pervin
(74) *Attorney, Agent, or Firm* — Finch & Maloney PLLC (57) ABSTRACT

A transmission arrangement for a hybrid drive of a motor vehicle, in particular a utility vehicle, having change-speed transmission (G) with a drive output shaft (AW), a retarder (RE) with a retarder shaft (RW), an electric machine (EM) with a rotor shaft (RO) and a first gear ratio step (Ü1) between the drive output shaft (AW) and the retarder shaft (RW). The retarder (RE) is driven by way of the first gear ratio step (Ü1). The electric machine (EM) is arranged with its axis parallel to the retarder (RE) and can be coupled to the retarder shaft (RW) by way of a second gear ratio step (Ü2).

13 Claims, 4 Drawing Sheets

(56) References Cited

FOREIGN PATENT DOCUMENTS

| EP | 1253036 A1 | * | 10/2002 | ............. | H02K 7/006 |
| WO | WO-2014075843 A2 | * | 5/2014 | ............. | B60K 6/365 |

OTHER PUBLICATIONS

Machine translation of DE 102009001146 A1 (Year: 2010).*
German Search Report Corresponding to 10 2020 202 659.9 dated Jan. 12, 2021.

* cited by examiner

TRANSMISSION ARRANGEMENT FOR A VEHICLE HYBRID DRIVE

This application claims priority from German patent application serial no. 10 2020 202 659.9 filed Mar. 2, 2020.

FIELD OF THE INVENTION

The invention relates to a transmission arrangement for a hybrid drive of a motor vehicle, in particular a utility vehicle, which comprises a change-speed transmission with a drive output shaft, a retarder with a retarder shaft, an electric machine with a rotor shaft and a first gear ratio step between the drive output shaft and the retarder shaft, wherein the retarder can be driven by way of the first gear ratio step.

BACKGROUND OF THE INVENTION

From DE 10 2009 001 146 A1 a drive-train of a motor vehicle comprising an internal combustion engine, a stepped shift transmission and a hydrodynamic retarder as a permanent brake is known. The retarder, which comprises a rotor, a stator and a retarder shaft, is connected to the drive output shaft of the stepped shift transmission via a gear ratio step, a so-termed booster, and can therefore be driven by the transmission output shaft. An electric machine with a rotor shaft is arranged coaxially with the retarder shaft, which is connected to the rotor of the retarder. The electric machine is provided primarily as a second permanent brake (in addition to the retarder), so that the electric machine is operated as a generator. Moreover, the electric machine also serves to assist the drive input from the internal combustion engine (hybrid drive), with the aim of reducing the fuel consumption.

SUMMARY OF THE INVENTION

Starting from this prior art, the purpose of the present invention, with a transmission arrangement of the type mentioned at the start, is to make the most of further potentials mainly by using a smaller electric machine.

The invention embodies the characteristics specified in the independent claim(s). Advantageous features emerge from the subordinate claims.

According to the invention, it is provided that the electric machine is arranged with its axis parallel to the retarder and can be coupled to the retarder shaft via a second gear ratio step. Preferably, the first and second gear ratio steps, i.e. on the one hand the known booster and on the other hand the second gear ratio step, are arranged between the rotor shaft of the electric motor and the retarder shaft, in one plane. The advantage of the axis-parallel or lateral arrangement is that no additional fitting space in the axial direction i.e. in the direction of the transmission output shaft, is needed for installing the electric machine.

According to a preferred embodiment a first shifting element, preferably a claw clutch, is arranged on the retarder shaft, by means of which the rotor of the retarder can be coupled to the first gear ratio step and the second gear ratio step. Thus, when the first shifting element is closed, the retarder is driven by the transmission output shaft and thus on the vehicle side via the booster. Optionally, the retarder or the rotor of the retarder can be accelerated by the electric machine via the second gear ratio step. Otherwise, the electric machine is incorporated in the drive-train as a P3 hybrid.

In a further preferred embodiment, the first and second gear ratio steps have a common output gearwheel which is arranged on the retarder shaft and is in the form of a loose wheel. This makes for a saving of weight and fitting space, particularly in the axial direction.

According to a further preferred embodiment, an additional gear ratio step, one that can be engaged if necessary, is arranged between the rotor shaft of the electric machine and the retarder shaft. Thus, the additional gear ratio step is arranged parallel to the second gear ratio step and can be engaged by means of a second shifting element. By means of this additional gear ratio step, the rotor of the retarder, after having previously been disengaged and put out of operation, can be boosted up, i.e. synchronized with the boosted rotational speed. When the rotational speeds are equal, a rotationally fixed connection between the drive output gearwheel of the booster and the retarder shaft can be produced by means of the first shifting element on the retarder shaft.

According to a further preferred embodiment, between the second gear ratio step and the electric machine there is arranged a first shiftable planetary gearset, by way of which the electric machine drives the second gear ratio step. This has the advantage that the drive input and the drive output of the planetary gearset are arranged coaxially and an additional gear ratio of the rotational speed or the electric machine can be realized.

In a further preferred embodiment, the first planetary gearset comprises a sun shaft forming the drive input shaft, a carrier shaft forming the drive output shaft and a ring gear shaft that can be engaged. In that way the planetary gearset can be operated with two different gear ratios.

According to a further preferred embodiment, in a first shift position the ring gear shaft is supported on the housing, i.e. held fixed—and in that way, between the driving sun shaft and the driven carrier shaft there is a gear ratio in the slow range, whereby the rotational speed of the electric machine can be adapted to the rotational speed of the retarder. In a second shift position the ring gear shaft is locked with the sun shaft, i.e. the planetary gearset rotates as a block, giving a gear ratio of 1:1 (the so-termed straight-through drive). The gearshifts are carried out by a shifting element. The synchronization takes place via the electric machine.

In a further preferred embodiment, the carrier shaft of the planetary gearset is connected rotationally fixed to the driving gearwheel of the second gear ratio step. This provides the possibility for the electric machine, when the retarder shaft is decoupled, to drive the transmission output shaft via the two gear ratio steps and thus assist the internal combustion engine (hybrid drive).

According to a further preferred embodiment, an additional gear ratio step is arranged parallel to the second gear ratio step for synchronizing the retarder shaft. In the event that the retarder is disconnected, when braking operation is resumed its rotor must be accelerated (boosted) to the rotational speed of the output side of the booster. This takes place when the retarder shaft is decoupled by means of the additional gear ratio step. When the rotational speeds are equal the first shifting element can be closed.

In a further preferred embodiment the transmission comprises a countershaft that can be coupled to a hybrid module. The hybrid module, which is disclosed in detail in the contemporaneously filed application by the present applicant under the internal file number ZF 205196, comprises a second electric machine, an add-on transmission and a second shiftable planetary gearset. Thus, the transmission arrangement has two electric machines, the first of which drives the transmission drive output shaft and the second drives the countershaft of the transmission. This increases the additional electric power for driving the motor vehicle.

According to a further preferred embodiment the first and second shiftable planetary gearsets are of identical design, whereby the production costs for the transmission arrangement as a whole can be reduced.

In a further preferred embodiment the first and second electric machines are of identical design, whereby the production costs for the transmission arrangement as a whole can be reduced further.

According to a further preferred embodiment, attached to the add-on transmission of the hybrid module is a compressor of an air-conditioning unit, which can be driven by the second electric machine. Further auxiliary aggregates can also be arranged on the add-on transmission and driven by the second electric machine.

BRIEF DESCRIPTION OF THE DRAWINGS

Example embodiments of the invention are illustrated in the drawings and will be described in greater detail below, so that from the description and/or the drawings further features and/or advantages may emerge. The drawings show.

DETAILED DESCRIPTION OF THE PREFERRED EMBODIMENTS

Figure 1:
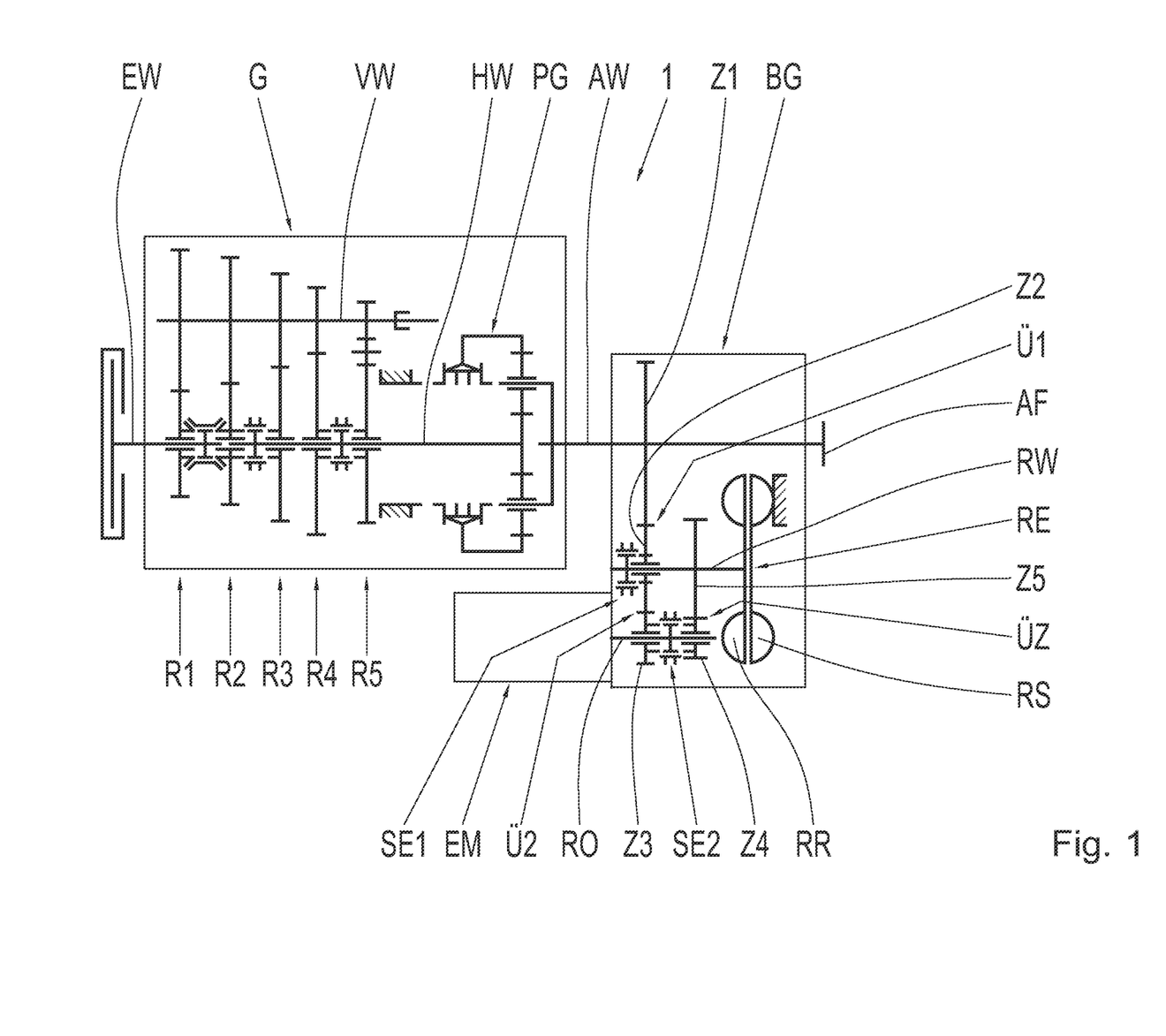
FIG. 1: a first example embodiment of the invention for a first transmission arrangement with a change-speed transmission, a retarder assembly and an electric machine.

FIG. 1 shows, as a first example embodiment of the invention, a first transmission arrangement 1 with a change-speed transmission G which comprises a transmission input shaft EW that can be driven by an internal combustion engine (not shown), a main shaft HW, a countershaft VW and a transmission drive output shaft AW, also called the output shaft AW for short, with an output flange AF. The transmission G has five wheel planes R1, R2, R3, R4, R5 with loose wheels on the input shaft EW and the main shaft HW, and with fixed wheels on the countershaft VW which engage with the loose wheels. The first two wheel planes R1, R2 form a splitter group, the other wheel planes R3, R4, R5 form a main group, and a shiftable planetary gearset PG connected by the main shaft HW to the main group forms a range group. The planetary gearset PG has two gear steps, a gear ratio in the slow range and a straight-through drive (gear ratio 1:1). Thus, a total of twelve gears can be engaged by the transmission G, which is common in utility vehicles. On the drive output side of the transmission G a retarder assembly BG with an electric machine EM is arranged. The retarder assembly BG comprises a hydrodynamic retarder RE consisting of a rotor RR and a stator RS as well as a retarder shaft RW, to which the rotor RR is connected in a rotationally fixed manner. The retarder shaft RW is driven by way of a first gear ratio step Ü1 consisting of a first gearwheel Z1 in the form of a fixed wheel arranged on the drive output shaft AW and a second gearwheel Z2 in the form of a loose wheel arranged on the retarder shaft RW. The loose wheel Z2 can be coupled to the retarder shaft RW by means of a first shifting element SE1, preferably a claw clutch. The electric machine EM is arranged with its axis parallel to the retarder RE, i.e. the retarder shaft RW and the rotor shaft RO of the electric machine EM are an axial distance apart from one another, which is bridged by a second gear ratio step Ü2 comprising a third gearwheel Z3 in the form of a loose wheel on the rotor shaft RO, and the second gearwheel Z2. The loose wheel Z3 can be coupled to the rotor shaft RO by means of a second shifting element SE2. Parallel to the second gear ratio step Ü2 there is arranged between the rotor shaft RO and the retarder shaft RW an additional gear ratio step ÜZ, which consists of a fourth gearwheel Z4 in the form of a loose wheel and a fifth gearwheel Z5 in the form of a fixed wheel. The loose wheel Z4 can be coupled by means of the second shifting element SE2 to the rotor shaft RO. The electric machine EM can be operated as a motor and as a generator, and is preferably designed for low-voltage operation, i.e. within the so-termed low-voltage limit of 48 volts.

During driving operation when the retarder RE is disconnected (the first shifting element SE1 being open) the electric machine EM assists the internal combustion engine since the rotor shaft RO, when the second shifting element SE2 is closed, drives the drive output shaft AW by way of the second gear ratio step Ü2, i.e. the third and second gearwheels Z3, Z2, and the first gear ratio step Ü1, i.e. the second gearwheel Z2 and the first gearwheel Z1. Thus, the power of the electric machine EM and the power of the internal combustion engine are both available at the output flange AF for driving the vehicle. Furthermore, the electric machine EM works during braking operation. i.e. when the retarder is engaged (the first shifting element SE1 and second shifting element SE2 are closed), since the electric machine EM is driven by the drive output shaft AW via the two gear ratio steps Ü1, Ü2 and then operates as a generator. Finally, when the retarder is disconnected the electric machine EM can be used for synchronizing or boosting the retarder shaft RW. In that case the second shifting element SE2 connects the rotor shaft RO to the loose wheel Z4, while the first shifting element SE1 is still open. When the retarder shaft RW has reached the rotational speed of the second gearwheel Z2 of the booster Ü1, the first shifting element SE1 can be closed, i.e. the second gearwheel Z2 can be coupled to the retarder shaft RW.

Figure 2:
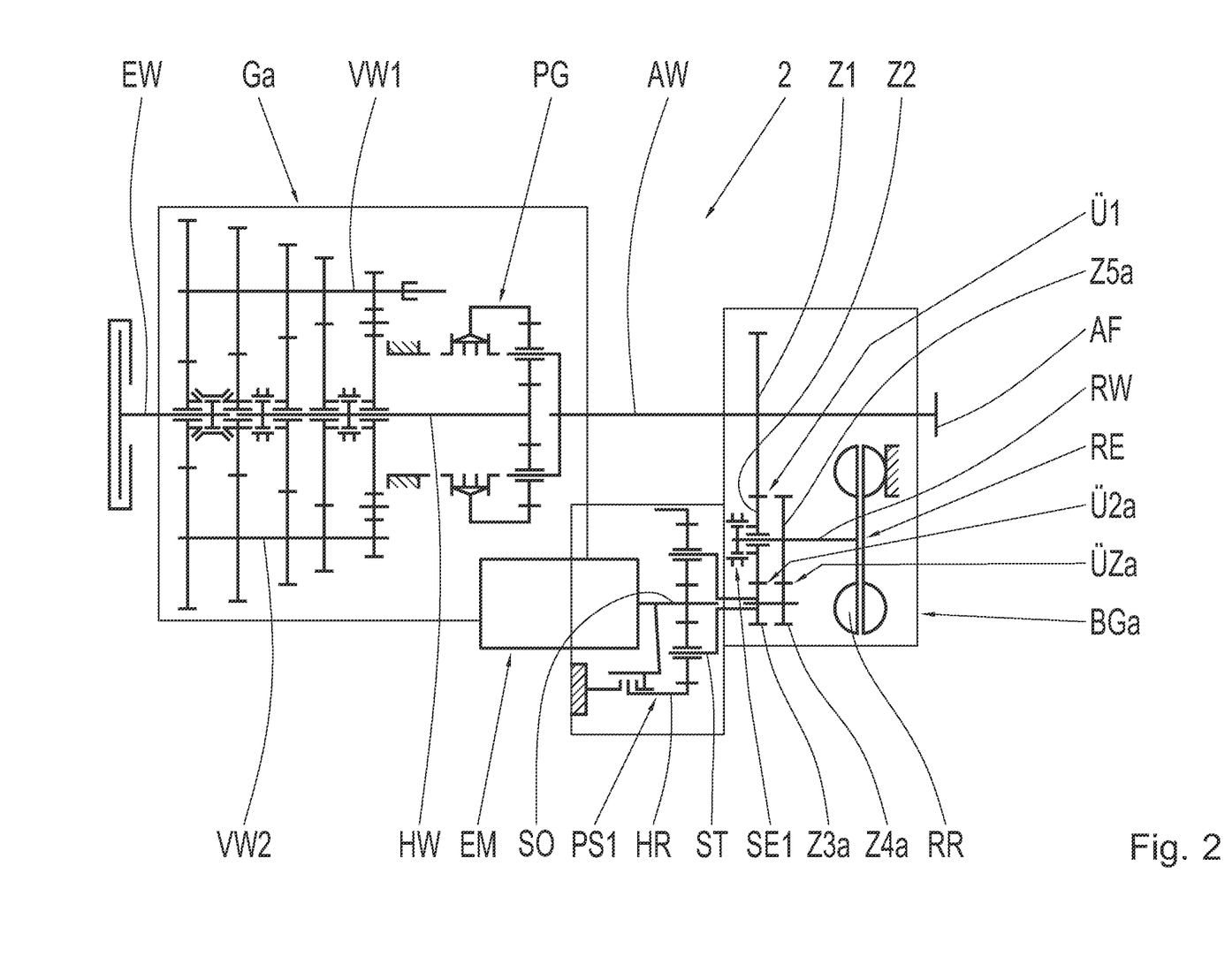
FIG. 2: a second example embodiment of the invention for a second transmission arrangement with a first shiftable planetary gearset.

As a second example embodiment of the invention, FIG. 2 shows a second transmission arrangement 2 with a change-speed transmission Ga, a retarder assembly BGa and a first shiftable planetary gearset PS1 which is arranged in the power flow between an electric machine EM and the retarder assembly BGa. For the same components the same indexes as in FIG. 1 are used. The change-speed transmission Ga has an input shaft EW, two countershafts VW1, VW2, a main shaft HW and a transmission drive output shaft AW, also called the output shaft AW for short, which has an output flange AF. As in the example embodiment shown in FIG. 1, the change-speed transmission Ga is again a group transmission with a splitter group, a main group and a range group, which is in the form of a planetary gearset PG. The difference compared to the exemplary embodiment according to FIG. 1 is therefore essentially the first switchable planetary gear set PS1 which comprises a sun shaft SO driven by the electric machine EM, a carrier shaft ST forming the output shaft, and a ring gear shaft HR by means of which two shift positions can be obtained. In a first shift position the ring gear shaft HR is supported relative to the housing, i.e. held fixed, whereas in a second shift position the ring gear shaft HR is locked with the sun shaft SO, so that the first planetary gearset PS1 rotates as a block. When the ring gear shaft HR is held fixed, the rotational speed of the electric machine EM is geared to the slow range.

As in the previous example embodiment, the retarder assembly BGa has a first gear ratio Ü1 (the so-termed booster) between the drive output shaft AW and the retarder shaft RW, and a first shifting element SE1 arranged on the retarder shaft RW, preferably in the form of a claw clutch. The loose wheel Z2 arranged on the retarder shaft RW engages with a third gearwheel Z3a, which is connected fast to the carrier shaft ST, forming a second gear ratio step Ü2a. Parallel to the second gear ratio step Ü2a, an additional gear ratio step ÜZa is provided, which consists of the gearwheel Z4a that can be driven by the carrier shaft ST and the gearwheel Z5a arranged rotationally fixed on the retarder shaft RW.

With the second transmission arrangement 2 the following three functions can be obtained: In the hybrid mode the electric machine EM assists the internal combustion engine and—with the first shifting element SE1 open—drives the drive output shaft AW via the two gear ratios Ü2a, Ü1. The transmission ratio is calculated such that the electric machine EM operates in the range of its optimum efficiency while the utility vehicle is driving at a typical speed, for example between 60 and 80 km/h. In the hybrid mode the first planetary gearset PS1 is blocked, and therefore rotates mainly without losses. In the braking mode, i.e. with the first shifting element S1 closed, via the booster Ü1 not only the rotor RR of the retarder RE, but via the second gear ratio Ü2a and the first planetary gearset PS1 rotating in the blocked condition, the electric machine EM is driven, which during the braking mode therefore operates as a generator. A third function is that after disconnecting the retarder RE, i.e. when the braking operation is resumed, the rotor RR of the retarder RE is synchronized upward by means of the electric machine EM, the first planetary gearset PS1 and the additional gear ratio step ÜZa, i.e. brought to the rotational speed of the second gearwheel Z2 of the booster Ü1. In that case the first planetary gearset PS1 is operated as a gear ratio transmission since the ring gear shaft HR is held fixed. When the rotational speeds are equal, the first shifting element SE1, i.e. the claw clutch, can be closed.

Figure 3:
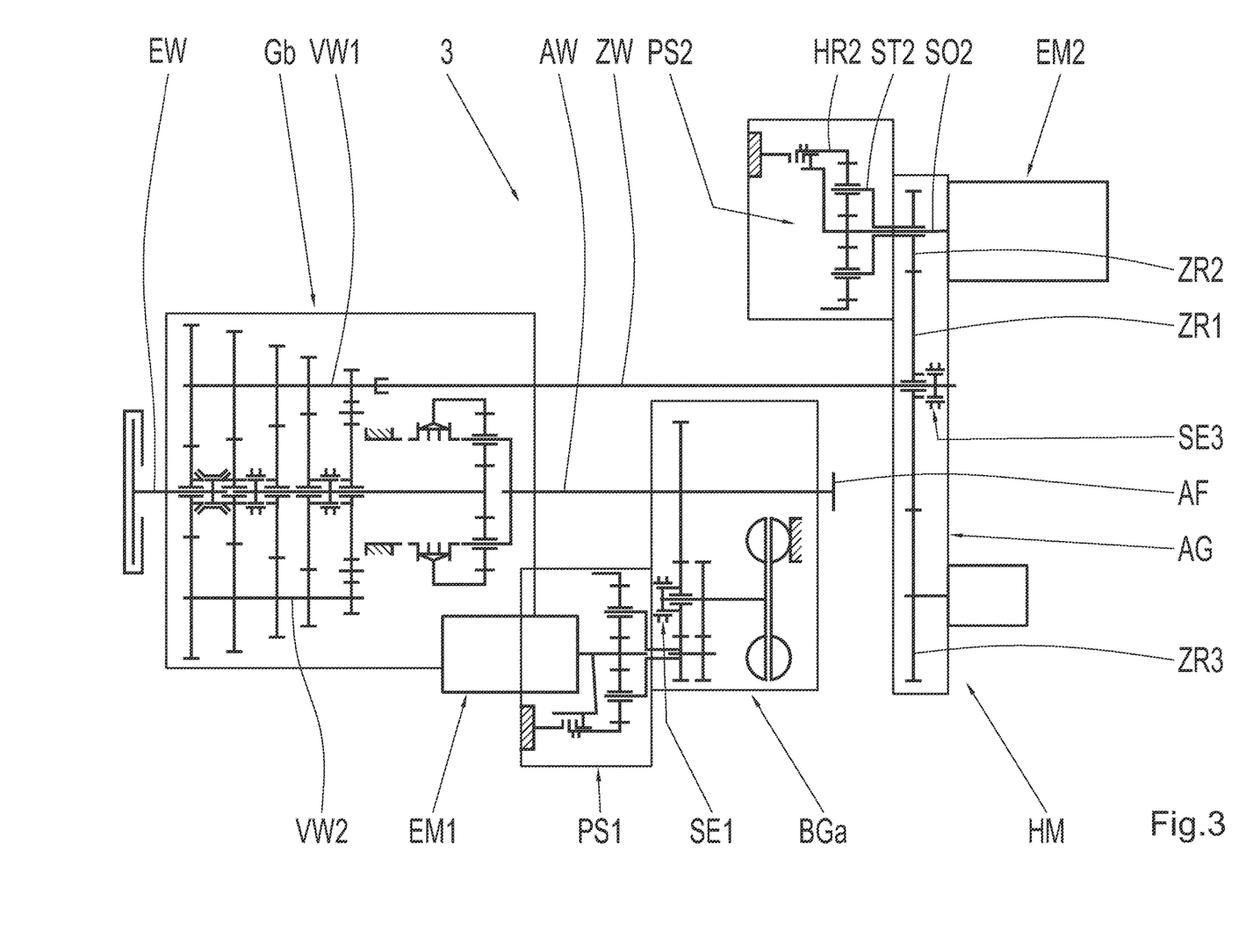
FIG. 3: a third example embodiment of the invention for a third transmission arrangement with an additional hybrid module and a second electric machine.

As a third example embodiment of the invention, FIG. 3 shows a third transmission arrangement 3 which, compared with the second transmission arrangement 2 shown in FIG. 2, differs in that it comprises an additional hybrid module HM as disclosed in detail in the contemporaneously filed application by the present applicant under the internal file number ZF 205196. The full extent of the contemporaneously filed application with the internal file number ZF 205196 is incorporated in the disclosure content of the present application. The hybrid module HM shown in FIG. 3 comprises an add-on transmission AG with a first gearwheel ZR1, a second gearwheel ZR2 and a third gearwheel ZR3, which are arranged in one plane and engage with one another. To the add-on transmission AG are attached on one side a second electric machine EM2 and on the other side a second planetary gearset PS2 arranged coaxially with the second electric machine EM2. Like the first planetary gearset PS1, the second planetary gearset PS2 is also shiftable and has a sun shaft SO2 driven by the second electric machine EM2, a carrier shaft ST2 that functions as the drive output shaft, and a ring gear shaft HR, which can be brought to two different coupling positions by a shifting element (not indexed): for a gear ratio in the slow range, the ring gear shaft HR2 is held fixed, and for a straight-through drive or gear ratio 1:1 the ring gear shaft HR2 is coupled (locked) to the sun shaft SO2. The add-on transmission AG is connected via a connecting or intermediate shaft ZW to the first countershaft VW1 of the change-speed transmission Gb, and on the intermediate shaft ZW, the first gearwheel ZR1 is arranged rotatably, and so too is a third shifting element SE3, preferably a claw clutch. Thus, the second electric machine EM2 can be engaged for the hybrid mode or—by opening the third shifting element SE3—it can be decoupled. The two planetary gearsets PS1, PS2 and the two electric machines EM1, EM2 can be of identical design.

In the third transmission arrangement 3, in the hybrid mode two electric machines EM1, EM2 are available for assisting the internal combustion engine, wherein the first electric machine EM1 drives the drive output shaft AW and the second electric machine EM2, via the second planetary gearset PS2 and the gear ratio step ZR2/ZR1 with the shifting element SE3 closed, drives the first countershaft VW1 by way of the intermediate shaft ZW.

Figure 4:
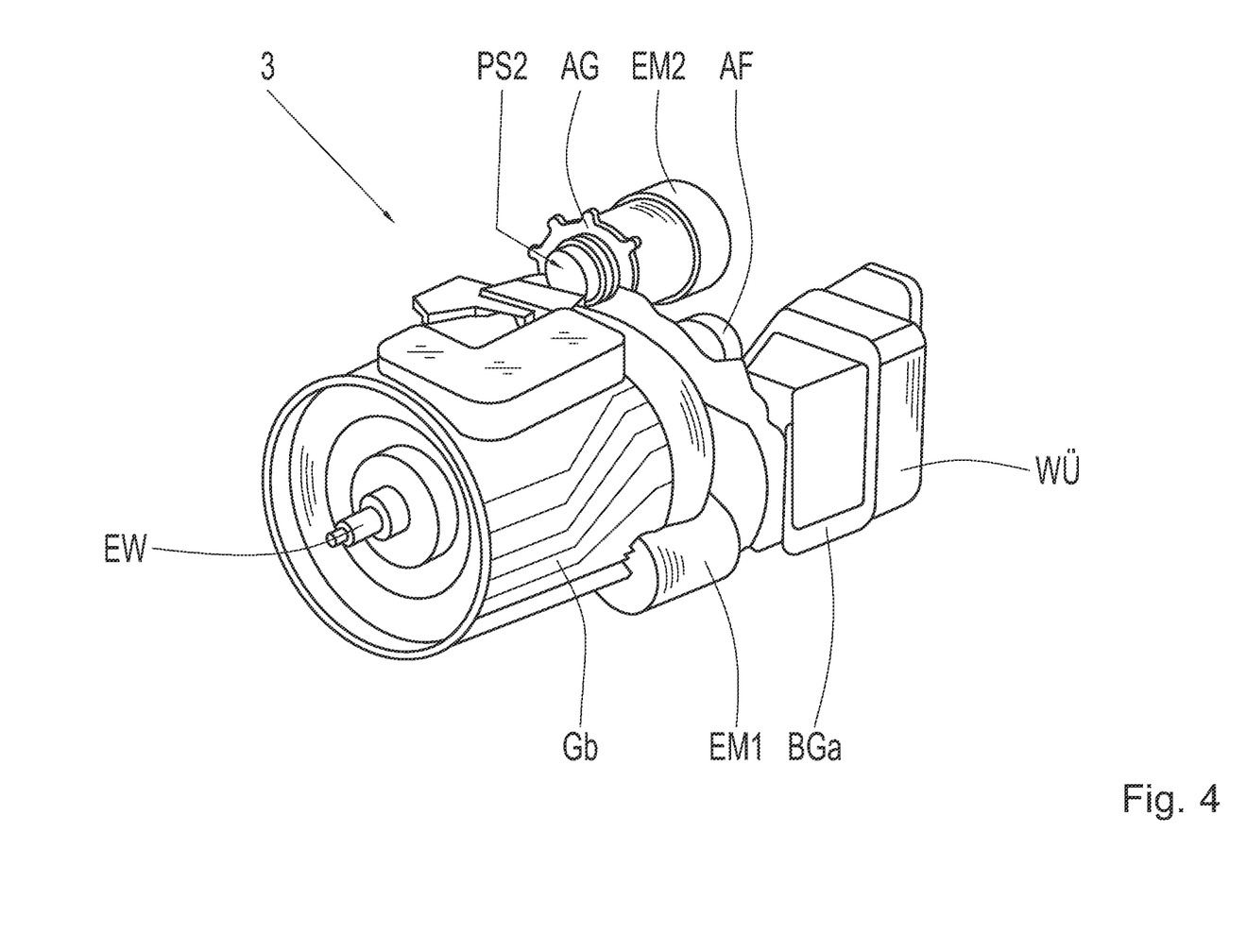
FIG. 4: a 3D representation of the third transmission arrangement shown in FIG. 3.

FIG. 4 shows the third transmission arrangement according to FIG. 3 in a 3D representation, wherein the same indexes are used for the same components. The change-speed transmission Gb has an input shaft EW on its drive input side and an output flange AF on its drive output side. On the drive output side of the transmission Gb is arranged the retarder assembly BGa with the first planetary gearset (not indexed) and the add-on transmission AG with the second electric machine EM2 and the second planetary gearset PS2. From the representation it can be seen that all the components are arranged to the side of the drive output flange AF and the drive output area with the drive output flange AF and an articulation shaft (not shown) connected thereto remains free. A heat exchanger WÜ is additionally attached to the retarder assembly BGa for cooling the retarder oil and/or the transmission oil.

INDEXES

1 First transmission arrangement
2 Second transmission arrangement
3 Third transmission arrangement
AF Drive output flange
AG Add-on transmission
AW Drive output shaft
BG Retarder assembly (FIG. 1)
BGa Retarder assembly (FIG. 2)
EM Electric machine
EM1 First electric machine
EM2 Second electric machine
EW Input shaft
G Change-speed transmission (FIG. 1)
Ga Change-speed transmission (FIG. 2)
Gb Change-speed transmission (FIG. 3)
HM Hybrid module
HR Ring gear shaft (PS1)
HR2 Ring gear shaft (PS2)
HW Main shaft
PG Planetary transmission
PS1 First planetary gearset
PS2 Second planetary gearset
R1 First wheel plane
R2 Second wheel plane
R3 Third wheel plane
R4 Fourth wheel plane
R5 Fifth wheel plane RE Retarder
RO Rotor shaft (EM)
RR Retarder rotor
RS Retarder stator
RW Retarder shaft
SE1 First shifting element
SE2 Second shifting element
SE3 Third shifting element
SO Sun shaft (PS1)
SO2 Sun shaft (PS2)
ST Carrier shaft (PS1)
ST2 Carrier shaft (PS2)
Ü1 First gear ratio step
Ü2 Second gear ratio step
Ü2a Second gear ratio step
Ü3 Third gear ratio step
ÜZ Additional gear ratio step
ÜZa Additional gear ratio step
VW Countershaft
VW1 First countershaft
WÜ Heat exchanger
Z1 First gearwheel
Z2 Second gearwheel
Z3 Third gearwheel
Z3a Third gearwheel
Z4 Fourth gearwheel
Z4a Fourth gearwheel
Z5 Fifth gearwheel
Z5a Fifth gearwheel
ZR1 First gearwheel
ZR2 Second gearwheel
ZR3 Third gearwheel
ZW Intermediate shaft

The invention claimed is:

1. A transmission arrangement for a hybrid drive of a motor vehicle, the transmission arrangement comprising:
a change-speed transmission with a drive output shaft,
a retarder with a retarder shaft that defines an axis of the retarder, a loose gearwheel being supported on the retarder shaft, and the loose gearwheel being connectable to the retarder shaft to coaxially rotate therewith,
an electric machine with a rotor shaft that defines an axis of the electric machine,
a first gear ratio step between the drive output shaft and the retarder shaft, the first gear ratio step comprising the loose gearwheel supported on the retarder shaft,
the retarder being drivable via the first gear ratio step,
the electric machine being arranged such that the axis of the electric machine is parallel to the axis of the retarder, and the electric machine being couplable to the retarder shaft by way of a second gear ratio step, the second gear ratio step comprising the loose gearwheel supported on the retarder shaft and a further gearwheel that meshes with the loose gearwheel supported on the retarder shaft, and
the loose gearwheel supported on the retarder shaft is a drive output gearwheel of the first and the second gear ratio steps.

2. The transmission arrangement according to claim 1, wherein a first shifting element is arranged on the retarder shaft, and the retarder is coupable to the first and the second gear ratio steps by the first shifting element.

3. The transmission arrangement according to claim 1, wherein a first planetary gearset is arranged in a power flow between the electric machine and the second gear ratio step.

4. The transmission arrangement according to claim 3, wherein the first planetary gearset comprises a sun shaft as a drive input shaft, a carrier shaft as a drive output shaft of the first planetary gearset and a shiftable ring gear shaft.

5. The transmission arrangement according to claim 4, wherein, in a first shift position, the ring gear shaft is held fixed on a housing, and, in a second shift position, the ring gear shaft is coupled to the sun shaft.

6. The transmission arrangement according to claim 4, wherein the carrier shaft is connected, in a rotationally fixed manner, to the further gearwheel of the second gear ratio step.

7. The transmission arrangement according to claim 4, wherein an additional gear ratio step, for synchronizing the retarder shaft, is arranged parallel to the second gear ratio step.

8. The transmission arrangement according to claim 3, wherein the change-speed transmission comprises a countershaft, which is couplable, by way of an add-on transmission and a shiftable second planetary gearset, to a second electric machine.

9. The transmission arrangement according to claim 8, wherein the second planetary gearset corresponds to the first planetary gearset.

10. The transmission arrangement according to claim 8, wherein the second electric machine corresponds to the first electric machine.

11. The transmission arrangement according to claim 8, wherein a compressor for an air-conditioning unit is associated with the add-on transmission.

12. A transmission arrangement for a hybrid drive of a motor vehicle, the transmission arrangement comprising:
a change-speed transmission with a drive output shaft,
a retarder with a retarder shaft that defines an axis of the retarder, a loose gearwheel being supported on the retarder shaft, and the loose gearwheel being connectable to the retarder shaft to coaxially rotate therewith,
an electric machine with a rotor shaft that defines an axis of the electric machine,
a first gear ratio step between the drive output shaft and the retarder shaft, the first gear ratio step comprising the loose gearwheel supported on the retarder shaft,
the retarder being drivable via the first gear ratio step,
the electric machine being arranged such that the axis of the electric machine is parallel to the axis of the retarder, and the electric machine being couplable to the retarder shaft by way of a second gear ratio step, the second gear ratio step comprising the loose gearwheel supported on the retarder shaft and a further gearwheel that meshes with the loose gearwheel supported on the retarder shaft, and
an additional shiftable gear ratio step is arranged between the rotor shaft of the electric machine and the retarder shaft, parallel to the second gear ratio step, and the additional shiftable gear ratio step comprises a fixed gearhweel that fixed to the retarder shaft.

13. A transmission arrangement for a hybrid drive of a utility vehicle, the transmission arrangement comprising:
a change-speed transmission having a drive output shaft,
a retarder having a retarder shaft defining an axis of the retarder,
an electric machine having a rotor shaft defining an axis of the electric machine,
a first gear ratio step between the drive output shaft and the retarder shaft, and the retarder being driven via the first gear ratio step, and the first gear ratio step comprises a loose gearwheel that is supported on the retarder shaft, the loose gearwheel being disengagably connectable to the retarder shaft, and the electric machine being arranged such that the axis of the electric machine is parallel to the axis of the retarder, and the rotor shaft of the electric machine being couplable to the retarder shaft by way of a second gear ratio step, and the second gear ratio step comprises the loose gearwheel supported on the retarder shaft and a further gearwheel that directly meshes with the loose gearwheel supported on the retarder shaft, and an additional shiftable gear ratio step is arranged between the rotor shaft of the electric machine and the retarder shaft, parallel to the second gear ratio step, and the additional shiftable gear ratio step comprises a fixed gearhweel that is fixed to the retarder shaft.

\* \* \* \* \*

UNITED STATES PATENT AND TRADEMARK OFFICE
CERTIFICATE OF CORRECTION

PATENT NO. : 11,511,616 B2
APPLICATION NO. : 17/185006
DATED : November 29, 2022
INVENTOR(S) : Bernard Hunold and Michael Preuß

It is certified that error appears in the above-identified patent and that said Letters Patent is hereby corrected as shown below:

In the Claims

Column 8, Line 54, change "gearhweel" to "gearwheel".

Column 9, Line 13, change "gearhweel" to "gearwheel".

Signed and Sealed this
Tenth Day of October, 2023

Katherine Kelly Vidal
*Director of the United States Patent and Trademark Office*